Nov. 10, 1964
R. F. HOWARD
3,156,580
METHOD OF SURFACE FINISHING METAL SURFACES
WITH EPOXY AND ACRYLIC RESINS
Filed Jan. 29, 1960
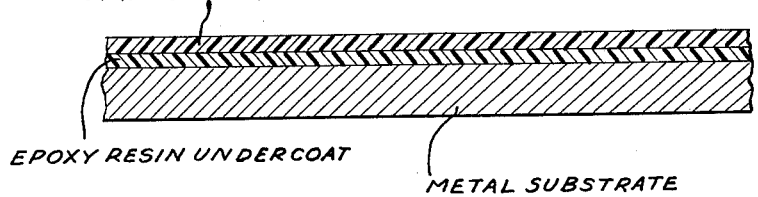
INVENTOR.
ROBERT F. HOWARD
BY
Bean, Brooks, Buckley&Bean
ATTORNEYS

United States Patent Office 3,156,580
Patented Nov. 10, 1964

3,156,580
METHOD OF SURFACE FINISHING METAL SURFACES WITH EPOXY AND ACRYLIC RESINS
Robert F. Howard, Fort Worth, Tex., assignor, by mesne assignments, to Bell Aerospace Corporation, Wheatfield, N.Y., a corporation of Delaware
Filed Jan. 29, 1960, Ser. No. 5,368
7 Claims. (Cl. 117—75)

The present invention is directed to a novel method for preparing a surface finish on metal or non-metallic surfaces. The surface finish set forth hereafter is specifically directed to a surface finish comprising an epoxy resin in combination with an acrylic resin.

Heretofore, it has not been possible to successfully and economically combine an epoxy resin with an acrylic resin. The two resins have been considered incompatible and no known successful method has been available utilizing their combination. Surface finish methods utilizing a final top coat of acrylic resin have not been able to take advantage of the very desirable properties of the epoxy resins. These methods have required multiple primer applications and/or operations to attain a desirable surface finish. Other disadvantages of surface finish methods heretofore and presently used include compatibility problems, limitation in primer "pot-life" and in some cases, the need for oven baking.

It is an object of the present invention to provide a surface finish comprising an epoxy resin with an acrylic resin, which surface finish has superior qualities of weathering, aging, appearance, flexibility, color retention and other desirable features.

It is a further object of this invention to provide a method of surface finish requiring a lesser number of operations and decreased handling, thus resulting in more economical and efficient processing.

It is well known that epoxy resins have superior qualities of adhesion, toughness (flexibility) and resistance to deterioration by chemicals. However, the poor properties of epoxy resins with respect to outdoor weathering and color retention have discouraged their use as a final surface finish for materials undergoing any outdoor exposure. It is also well known that the acrylic resins, on the other hand, possess in excellent degree those qualities of weather resistance and color retention. It is clear that a blending of the properties of the epoxies and the acrylics could be highly beneficial. However, the acrylics and the epoxies have been considered to be incompatible. Application of an acrylic to an epoxy base ordinarily results in inadequate adhesion of the acrylic to the epoxy.

Thus, it has heretofore been considered impossible to successfully combine the superior qualities of the epoxies and the acrylics. The manner in which this can be accomplished is herein detailed.

In accordance with the present invention as illustrated in the drawing, the surface of the material to be finished or painted is first prepared with a chemical film treatment generally known in the art. The material is then processed for the purpose of obtaining a water break-free surface condition. These cleansing procedures constitute no part of this invention and conform to the general requirement for a clean, raw surface.

An epoxy resin is first applied to the cleansed surface. Such application may be performed in any suitable manner for applying a normal paint coating. Before the epoxy has had time to fully cure or catalyze, an overcoat of an acrylic resin is applied. It is necessary that the epoxy is in a state of only partial or very little curing or catalyzation at the time the acrylic is added. Under these conditions the epoxy and the acrylic become compatible and a firm bond is effected between the two materials. The application of the acrylic to the partially or uncatalyzed epoxy results in a surface finish of superior adhesion, appearance, abrasion, chemical resistance, corrosion, and weathering qualities. This also permits the overcoated epoxy to retain desired flexibility throughout the life of the acrylic topcoat.

The epoxies used in the present invention include Convair (Spec. FM5 00038), Alpon (off-white) and Brolite (off-white catalyzed epoxy primer). The present invention is not limited to these epoxy resins since all epoxy resins may be used and will be compatible with acrylic resins.

A catalyst may be used with the epoxy resin; however, the type catalyst used with the epoxy resin is not limited since the normally used epoxy catalysts in no way inhibit the compatibility between the epoxy resins and the acrylic resins.

The solvents used are those commonly used for both the epoxy resins and the acrylic resins.

The acrylic resins may include copolymers of methyl methacrylate and other acrylic esters, pure acrylic resin, and Lucite. These acrylic resins while used with the epoxy resins are not limited to the above-stated acrylic resins.

The following are combinations used in accordance with the present invention:

(A)

(1) "Brolite" epoxy (Andrew Brown) with acrylic lacquer manufactured in accordance with Mil. Spec. MIL-L-19537
(2) "Brolite" epoxy (Andrew Brown) with "Lucite" nitro cellulose acrylic (Du Pont)

(B)

(1) "Alpon" epoxy (Allied Paint Co.) with Mil. Spec. MIL-L-19537 acrylic lacquer
(2) "Aplon" epoxy (Allied Paint Co.) with "Lucite" polymethylmethacrylate (C)

(1) Conver Prime (General Paint Co.) with MIL-L-19537
(2) Conver Prime (General Paint Co.) with "Lucite"

All of these combinations have been compatible, with this process, and have given finishes equal to or superior to any known finish with added benefits as noted.

These combinations were given the following tests:

A. "Radius bend" tests—in which the painted metal is bent sharply and the adhesion of the paint to the metal noted.
B. "Water soak tape" test—in which the test piece is soaked for 24 hours in distilled water, dried, cuts made through to base metal, pressure sensitive adhesive attached to the section between the cuts and pulled off.
C. Accelerated weathering test with the Atlas Weatherometer—simulating outdoor weathering.
D. Salt spray tests.
E. Abrasion tests.
F. Turbine oil (MIL-L-7808) and potassium hydroxide of silver cell storage batteries resistance tests.
G. Outdoor exposure rack—panels showed no damage when formed over ¼" mandrel after 2¼ years exposure on the outdoor rack.

The results were equal to or superior to existing processes, and reduce the number of operations involved.

An additional advantage of the invention is that it requires only a single primer, that of the epoxy. Other methods using metal primers or wash primers in preparation for a final top coat of acrylic, require an intermediate or sandwich primer, often also requiring high temperature baking between the first and sandwich primers. The present method eliminates the need for a second primer and requires no intermediate heating operation.

It has been determined that the acrylic topcoat may be applied as long as seventy-two hours after application of the epoxy primer. Beneficial results are obtained by the application of the acrylic as soon as possible after flash-off of the solvent in the epoxy. Air drying times of approximately fifteen minutes for the epoxy before overcoating have produced highly superior finishes.

It has also been determined that the acrylic will air-dry sufficiently within 6–8 hours to support masking tape. Cure of the complete system can be accelerated by heating for one hour at a temperature of approximately 180° F.

While there are above disclosed but a limited number of embodiments of the process and product of the invention herein presented, it is possible to produce still other embodiments, without departing from the inventive concept herein disclosed and it is desired therefore that only such limitations be imposed on the appended claims as are stated therein, or required by the prior art.

The embodiments of the invention in which an exclusive property or privilege is claimed are defined as follows:

1. In the process of coating the surface of an article, the steps of
    cleaning the article,
    applying a layer of fluid epoxy resin containing a catalyst therefor directly to the surface of the article,
    and then applying a layer of fluid acrylic resin containing a catalyst therefor directly to the epoxy resin layer,
    in which the acrylic resin layer is applied while the epoxy resin layer is only partially cured.

2. The process according to claim 1 wherein the acrylic resin layer is applied to the partially cured epoxy resin layer approximately 15 minutes after application of the epoxy resin layer.

3. In the method of surface finishing metal surfaces with a combination of epoxy paint and acrylic paint, the steps of
    cleaning the metal surface and applying directly thereto a coat of fluid epoxy primer containing a catalyst therefor,
    and then applying a top coat of acrylic paint directly to the primer layer while the latter is in a state of partial cure.

4. The method according to claim 3 wherein the acrylic paint is applied to the partially cured epoxy resin layer about 15 minutes after the application of the primer layer.

5. In the process for the preparation of a surface finish to an article,
    applying to the article a layer of fluid epoxy resin containing a catalyst,
    and then applying a layer of fluid acrylic resin upon the layer of epoxy resin while the latter is in a state of partial cure.

6. In the process according to claim 5 wherein the acrylic resin is selected from the group consisting of polymers of methacrylate and acrylic esters.

7. The process of coating a metal surface, which comprises
    cleaning the metal surface,
    coating the metal surface with a layer of fluid, incompletely cured epoxy resin containing a catalytic curative,
    then coating the layer of epoxy resin with a layer of fluid acrylic resin while the layer of epoxy resin is only partially cured,
    and then permitting both layers to cure.

References Cited in the file of this patent

UNITED STATES PATENTS

| | | |
|---|---|---|
| 1,912,371 | Jacobson | June 6, 1933 |
| 2,842,459 | Gollub et al. | July 8, 1958 |
| 2,864,722 | Millar et al. | Dec. 16, 1958 |
| 2,887,404 | Evans | May 19, 1959 |
| 2,902,471 | Bruin | Sept. 1, 1959 |
| 2,940,872 | Gusman | June 14, 1960 |
| 2,949,380 | Stuart | Aug. 16, 1960 |
| 2,949,383 | Blake | Aug. 16, 1960 |
| 2,992,132 | Melamed | July 11, 1961 |
| 3,023,124 | Cryderman et al. | Feb. 22, 1962 |
| 3,042,545 | Kienle et al. | July 3, 1962 |